United States Patent [19]

Chandalia et al.

[11] 4,094,868
[45] June 13, 1978

[54] AZO DI-ESTER POLYOLS FOR GRAFT COPOLYMERIZATION

[75] Inventors: Kiran B. Chandalia, Cheshire; Frank J. Preston, Meriden, both of Conn.

[73] Assignee: Olin Corporation, New Haven, Conn.

[21] Appl. No.: 780,213

[22] Filed: Mar. 22, 1977

[51] Int. Cl.$^2$ .................. C07C 107/02; C08G 63/00; C08J 9/00
[52] U.S. Cl. .................. 260/192; 260/2.5 A; 260/2.5 AB; 260/2.5 AC; 260/2.5 AE; 260/2.5 AQ; 260/77.5 AN; 260/77.5 AT; 260/77.5 CH; 260/526 R; 260/534 E; 260/404; 2260/465.4; 260/858; 260/859 R; 260/891; 260/898
[58] Field of Search .......................................... 260/192

[56] References Cited

U.S. PATENT DOCUMENTS

| | | | |
|---|---|---|---|
| 3,268,506 | 8/1966 | de Vries | 260/192 |
| 3,285,949 | 11/1966 | Siebert | 260/192 X |
| 3,306,888 | 2/1967 | Mortimer | 260/192 X |
| 3,752,802 | 3/1973 | Sheppard et al. | 260/192 |
| 3,812,095 | 5/1974 | Sheppard et al. | 260/192 |
| 3,890,294 | 6/1975 | Sheppard et al. | 260/192 X |
| 3,949,015 | 4/1976 | Laverty et al. | 260/192 X |

FOREIGN PATENT DOCUMENTS

| | | | |
|---|---|---|---|
| 2,124,000 | 11/1972 | Germany | 260/192 |

*Primary Examiner*—Floyd D. Higel
*Attorney, Agent, or Firm*—Robert J. Feltovic; Thomas P. O'Day

[57] ABSTRACT

Compounds containing an azo-linkage connecting two similar polyol esters constituents are described. These azo di-ester polyols are prepared by the direct esterification of azo diacids with polyols, in the presence of a strong mineral acid catalyst. The azo di-ester polyol products function as free radical initiators and grafting bases in the graft copolymerization of unsaturated monomers with polyols. These graft copolymers are useful in the formulation of polyurethanes.

11 Claims, No Drawings

AZO DI-ESTER POLYOLS FOR GRAFT COPOLYMERIZATION

BACKGROUND OF THE INVENTION

1. Field of the Invention

The invention relates to azo compounds containing polyol ester constituents.

2. Prior Art

Azo-containing polymers formed by reacting a polymer having a group reactive with an acyl group and an azo compound having two acylating functions are known in the art, as exemplified by U.S. Pat. No. 3,752,802. This patent shows (see Example X) the preparation of such azo compounds by reaction of an azo-bis diacid chloride, such as trans-4,4'-azo-bis-(4-cyanovaleryl chloride), with a monohydroxyl-terminated polyether. These type azo-containing polymers are described as being useful to make block and graft copolymers by treating them with polymerizable vinyl-type monomers. Such copolymers are stated to have utility as stabilizers of solutions of different homopolymers. However, the azo-containing polymers illustrated are not azo di-ester polyols and accordingly do not contain the multiple hydroxyl groups as are necessary for graft copolymer end use in polyurethane applications.

SUMMARY OF THE INVENTION

Novel azo di-ester polyols have now been developed which are particularly useful in the preparation of graft copolymers for polyurethane end uses. These novel azo compounds can be represented by the formula:

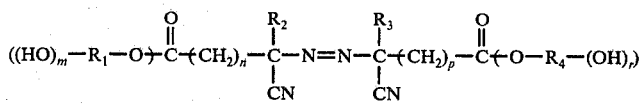

wherein:
  $m$ and $r$ independently are integers from 2 to 5;
  $n$ and $p$ independently are integers from 0 to 5;
  $R_2$ and $R_3$ independently are alkyl radicals of 1 to 4 carbons; and
  groups $((HO)_m - R_1 - O)$ and $(O - R_4 - (OH)_r)$ independently are residues of polyols after removal of one hydroxy hydrogen therefrom.

These azo compounds can be prepared by a novel single-step esterification method comprising direct esterification of azo diacids with polyols, in the presence of a strong mineral acid.

The azo-di-ester polyols of the present invention include multiple terminal hydroxyl groups which make them particularly useful in preparing graft copolymers for polyurethane end use formulations.

DETAILED DESCRIPTION OF THE PREFERRED EMBODIMENTS

The azo di-ester polyols of the present invention can be represented by the formula:

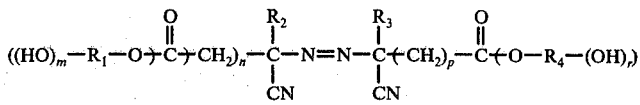

wherein:
  $m$ and $r$ independently are integers from 2 to 5;
  $n$ and $p$ independently are integers from 0 to 5;
  $R_2$ and $R_3$ independently are alkyl of 1 to 4 carbons; and
  the groups $((HO)_m - R_1 - O)$ and $(O - R_4 - (OH)_r)$ independently are residues of polyols, $R_1(OH)_{m+1}$ and $R_4(OH)_{r+1}$, wherein $R_1$ and $R_4$ independently represent polyether or polyester chains, after removal of one hydroxy hydrogen therefrom.

The azo di-ester polyols of the above formula include both symmetrical and non-symmetrical azo di-ester polyol compounds. Symmetrical azo-bis ester polyols can be prepared by reacting an azo-bis diacid with a polyol. Unsymmetrical azo di-ester polyols can also readily be formulated by reacting an unsymmetrical azo diacid with a polyol or a mixture of polyols or by reacting an azo-bis diacid with a mixture of polyols. The symmetrical azo di-ester polyols, hereinafter referred to as azo-bis ester polyols, are preferred. In order to simplify the presentation herein, the azo-bis ester polyols have been selected to be discussed in more specific detail below. The principles presented are readily adaptable to unsymmetrical azo di-ester polyols. The azo-bis ester polyols of the present invention can be represented by the formula:

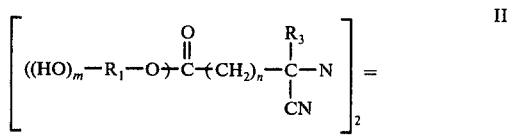

wherein:
  $m$, $n$, $R_3$ and $((HO)_m - R_1 - O)$ are as defined above.

Particularly preferred are azo-bis ester polyols of the formula:

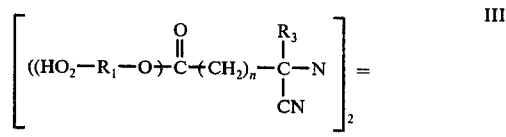

wherein:
  $n$ is 0 to 2;
  $R_3$ is alkyl of 1 to 3 carbons; and
  $((HO)_2 - R_1 - O)$ is the residue of a polyether triol after removal of one hydroxy hydrogen therefrom.

These azo-bis ester polyol compounds can be prepared by directly esterifying a polyol with a suitable azo-bis diacid.

The azo-bis diacid reactant can be prepared from keto acids, according to a known procedure (e.g., *J. Chem. Soc.*, [London], [1955], p. 4256), by reacting the keto acid, or mixture of such acids, with hydrazine in the presence of sodium cyanide. The ketone functionality presumably forms an azine in reaction with the hydrazine which, in turn, then adds hydrogen cyanide to result in a substituted hydrazine. This reaction is illustrated by the following example, wherein $n$ and $R_3$ are as defined in Formula II above.

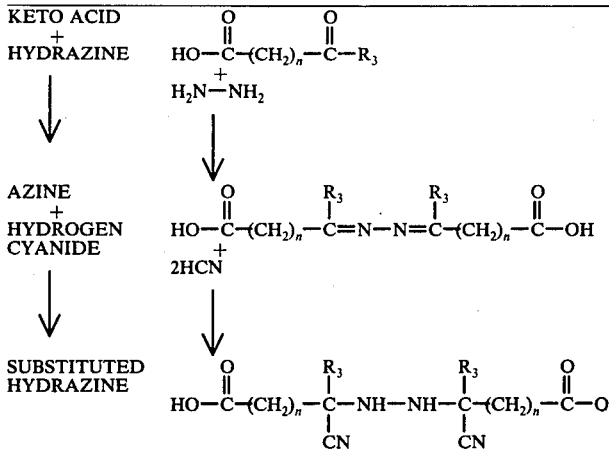

In order to form the azo-bis diacid, the substituted hydrazine can be oxidized by passing a halogen gas, such as bromine or chlorine, through the hydrazine solution. The following illustrates such a reaction:

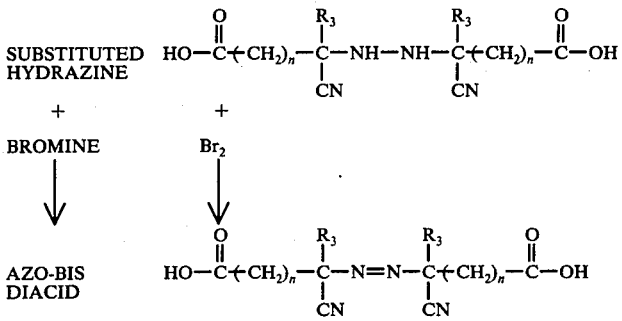

Any keto acid may be used. Typical keto acids which may be used include levulinic acid, pyruvic acid, 2-keto butanoic acid, 2-keto pentanoic acid, 2-keto hexanoic acid, 3-keto butanoic acid, 5-keto hexanoic acid, 6-keto heptanoic acid, 7-keto octanoic acid, 7-keto undecanoic acid and the like. Preferred keto acids are levulinic, pyruvic, 2-keto butanoic acid and 2-keto pentanoic acid.

It has now been found, that, in an appropriate reaction setting, the azo-bis diacid, as defined above, can successfully be made to directly esterify with polyols. Alcohol-acid ester-forming reactions are usually quite slow; use of a weakly reactive acid and a high molecular weight alcohol serves to further encumber the reaction mechanism and, hence, retard reaction speed and yield.

Because of the low reactivity of the azo-bis diacids and the molecular size of the polyols used in the present process, to directly esterify the diacid with the polyols is not practicable under standard conditions.

In the present situation, it has surprisingly been found that by conducting the esterification in a solution including about 0.1 to 10 percent by weight, based on the total weight of the polyol and azo diacid reactants, of a mineral acid, such as sulfuric, phosphoric or hydrohalic acid, the azo diacid and polyol can be forced to esterify. In particular, hydrochloric acid has been found to be preferable, since it can readily be removed from the azo-bis ester polyol product. Common clean-up procedures such as purging the product with an inert gas (e.g., nitrogen) and/or silicate clay treatment and filtering can be utilized to remove this acid catalyst. About 1 to about 5 percent acid concentration has been found to result in advantageous yields.

To diesterify the azo diacid reactant, 2 moles of polyol reactant are required per mole of diacid. However, to shift the equilibria of the esterification reaction to more favorable ester yield, use of excess polyol is preferred. A molar ratio of polyol to diacid of from about 2.5 to about 5:1 is particularly preferred. The excess unreacted polyol preferably may be allowed to remain with the product to result in an azo di-ester polyol-unreacted polyol mixture, which is then used in the graft copolymerization reaction described hereinafter.

The direct esterification reaction is conducted by heating the azo diacid mixed with the polyol in the presence of the mineral acid catalyst. If a gaseous acid catalyst, such as the preferred HCl, is utilized, the catalyst can conveniently be bubbled through the reaction mixture as the reaction progresses. Proper reaction temperatures vary with reactants but normally range between about 40° and about 80° C. Care must be exercised to keep the reaction temperature below the temperature at which the selected azo diacid decomposes, so that the azo-carbon linkages are not ruptured. Reaction temperatures of about 50° to 60° C are particularly preferred.

Initially, the azo diacid reactant is insoluble in the polyol reactant. As the reaction progresses, the diacid is esterified with the polyol until, at completion, the reaction solution becomes clear. To ensure complete reaction, post-reaction conditions are maintained for about an hour or so.

The direct esterification reaction is exemplified by the following illustration wherein $m$, $R_3$ and $((HO)_m—R_1—O)$ are as defined in Formula II above:

comprises aliphatic triols such as glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product

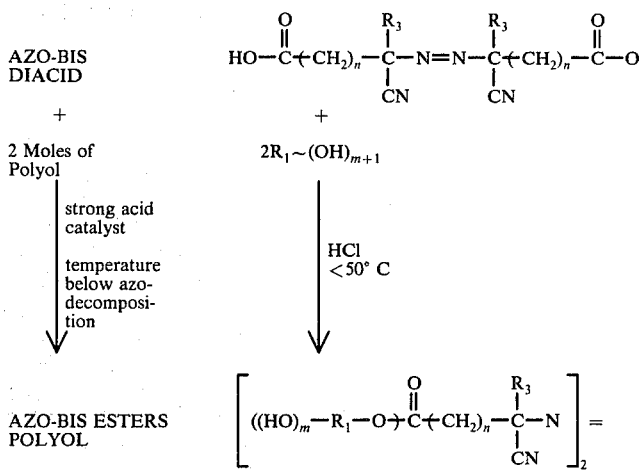

The polyol reactant which is used in preparing the azo di-ester polyols of the invention can be any such compound, including mixtures of two or more such compounds, having 3-6 hydroxyl groups and preferably an average equivalent weight from about 250 to about 5000. This includes polyester polyols and polyether polyols. However, the polyether polyols are generally preferred.

The polyester polyols include the products of reacting polycarboxylic acids with polyhydric alcohols. Illustrative polycarboxylic acids include, for example, oxalic, malonic, succinic, glutaric, adipic, pimelic, suberic and azelaic acids and the like. Illustrative polyhydric alcohols include various triols, tetrols and higher-functionality alcohols, such as glycerol, trimethylolpropane, pentaerythritol, sorbitol, mixtures thereof and the like.

The polyether polyols, the use of which is preferred herein, include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the polyether polyol reactant can be any such material which has from 3 to 6 active hydrogens. This includes (a) the aliphatic triols such as glycerol, trimethylolpropane, triethylolpropane, trimethylolhexane and the like, (b) higher-functionality alcohols such as sorbitol, pentaerythritol, methyl glucoside and the like, (c) the polyamines such as tetraethylene diamine and (d) the alkanolamines such as diethanolamine, triethanolamine and the like.

A preferred group of polyhydric initiators for use in preparing the polyether polyol reactant is one which having an average equivalent weight of about 250-5000, preferably about 700-3000 and more preferably about 1000-1500. The catalyst is thereafter preferably removed, leaving a polyether polyol which is ready for use in preparing the azo di-ester polyols of the invention.

The azo di-ester polyols of the subject invention can also be prepared by first transforming the azo diacid into a more reactive derivative. The azo diacid chloride can be reacted with a polyol to form the desired copolymer product. The diacid can readily be converted to its azo diacid chloride according to known methods (e.g., U.S. Pat. No. 3,752,802, Example VI). Three reagents are commonly used to substitute a —Cl for the —OH of a carboxylic acid: thionyl chloride, $SOCl_2$; phosphorus trichloride, $PCl_3$; and phosphorus pentachloride, $PCl_5$. Of these, thionyl chloride is particularly convenient, since the by-products formed are gases (HCl + $SO_2$) which are thus easily separable from the diacid chloride. Any excess of the low-boiling $SOCl_2$ (B.P. 79° C) can be removed by distillation.

Alternatively, the azo di-ester polyols of the subject invention can also be prepared by transesterification of an azo diacid ester with a polyol. In this procedure, the azo diacid first is diesterified with a low molecular weight alcohol, such as methanol. The di-ester then is transesterified in the presence of a catalyst, such as sodium methoxide, with the polyol, whereby the polyol radical exchanges places with the methyl group.

Direct esterification features distinct advantages over other methods, since, for example, the gaseous HCl byproduct of the acid chloride route is avoided, and single-step esterification from the diacid is more economical.

To form graft copolymer, the azo di-ester polyols are treated with an ethylenically unsaturated monomer or mixture of such monomers, usually in the presence of additional polyol. The monomers useful in the copolymerization process are polymerizable monomers characterized by the presence of at least one polymerizable ethylenic unsaturated group of the type $>C=C<$.

Such monomers are exemplified by those described in U.S. Pat. No. 3,383,351, column 4, lines 61–75 and column 5, lines 1–40. Preferred monomers include styrene, acrylonitrile, vinyl chloride, methyl methacrylate, hydroxy ethyl acrylate, butadiene, isoprene, chloroprene, and the like. In particular, styrene and acrylonitrile have been found to be preferred. The reaction temperature for copolymerization should be above the thermal decomposition temperature of the particular azo-bis ester employed. Such temperatures normally will range from about 70° to 150° C. Additional free radical catalyst is not required, as the azo-carbon linkage within the chain of the azo-bis ester polyol itself is broken at the reaction temperature and the free radicals formed serve as suitable catalysts for initiating the monomer polymerization. Hence, grafting of the vinyl monomers takes place directly on the polyol chain at the site of the severed bond. This eliminates dependency of grafting through hydrogen abstraction alone. The overall grafting reaction can be characterized by the following, wherein $m$, $R_3$ and $((HO)_m - R_1 - O-)$ are as defined in formula II above:

b. Polyether triol B was prepared from glycerol by base catalyzed block addition of propylene oxide capped with ethylene oxide such that the ethylene oxide content was approximately 9.8% and the primary hydroxyl content was approximately 55%. Final OH number was 37.

c. Polyether triol C was prepared from glycerol by base catalyzed random addition of propylene oxide and ethylene oxide such that the ethylene oxide content was approximately 5% and the primary hydroxyl content was approximately 0%. Final OH number was 56.

d. Polyether triol D was prepared from glycerol by base catalyzed block addition of propylene oxide capped with ethylene oxide such that the ethylene oxide content was approximately 11% and the primary hydroxyl content was approximately 55%. Final OH number was 56.

2. Preparation of Azo-Bis Ester Polyols—HCl Catalysis a. 3.0 g of 4,4'-azo-bis-(4-cyanovaleric acid) was mixed in a 500 ml three-neck flask with 240 g of

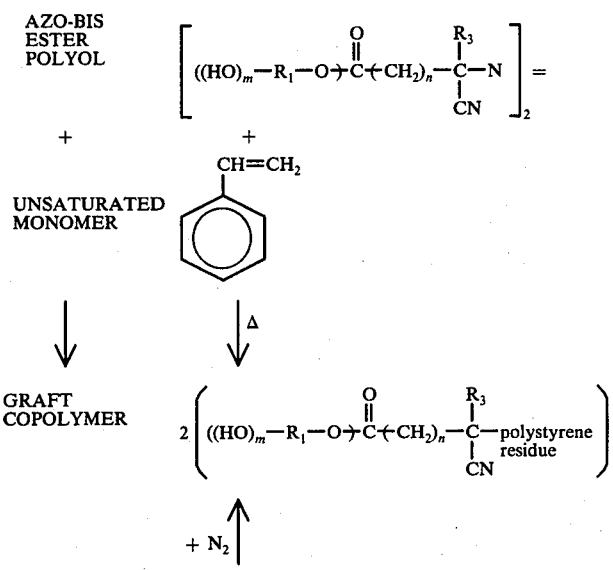

The graft copolymers formed are particularly suited for use in polyurethane formulations. Presence of multiple terminal hydroxyl groups allows for reaction with polyisocyanates. Modification of the amount of terminal hydroxyls results in variation of the degree of branching and cross-linking in the resulting polyurethane products. Accordingly, desired physical properties can be manipulated.

The following examples are provided to further illustrate the invention. All parts and percentages are by weight unless otherwise specified.

PREPARATION OF AZO-BIS ESTER POLYOL BY DIRECT ESTERIFICATION

Example I

1. Preparation of Polyether Polyols
    a. Polyether triol A was prepared from glycerol by base catalyzed block addition of propylene oxide capped with ethylene oxide such that the ethylene oxide content was approximately 14% and the primary hydroxyl content was approximately 70%. Final OH number was 37 mg KOH/g.

polyol A. This is a 5:1 molar ratio of polyol to azo acid. The flask was fitted with an inlet sparge tube for gaseous HCl, a mechanical stirrer, a thermometer and an outlet tube for HCl, which was vented into a drain with constant water flow. The flask was heated by an oil bath to 40° C and HCl flow begun. An exotherm was noted and the temperature rose to 55°–60° C where it was maintained with moderate HCl flow for about 3 hours or until the HCl concentration reached about 5 percent by weight. During this period, the azo acid gradually dissolved and the polyol solution changed to an amber color.

After about 3 hours, a clear solution was observed. Nitrogen gas was then passed through the sparge tube while maintaining temperature at 55°–60° C. From time to time, the exit stream was tested with wet litmus paper to detect traces of HCl, however, a more sensitive indicator was odor. After approximately 3 to 4 hours, HCl elimination was complete. A vacuum was then imposed on the system for 15 minutes to remove all gases from the system. On cooling, the polyol solution turned hazy.

A sample of azo-bis ester polyol A was withdrawn for various analyses.

| Gel Permeation Chromatography | OH No. mg KOH/g | Acid No. mg KOH/g |
|---|---|---|
| 86% 4600 (M.W.) 14% 8300 (M.W.) | 31.3 | 1.0 |

The material was treated with 1.2 g of magnesol and 1.2 g of supercel for 1 hour and then filtered through Whatman No. 1 filter paper. The product obtained was clear. The final acid number of the azo product was 0.26 mg KOH/g.

b. Polyol B was reacted using the same general scheme as outlined above. A 2.5:1 molar ratio of polyol to azo acid was used. Analyses of the final product yielded the following data:

| Gel Permeation Chromatography | OH No. mg KOH/g | Acid No. mg KOH/g |
|---|---|---|
| 76% 4500 (M.W.) 24% 6000 (M.W.) | 30.6 | 1.0 | c. Polyol C was reacted using the same general scheme as outlined above. A 2.5:1 molar ratio of polyol to azo acid was used. Analyses of the final product yielded the following data:

| Gel Permeation Chromatography | OH No. mg KOH/g | Acid No. mg KOH/g |
|---|---|---|
| 78% 3000 (M.W.) 22% 4500 (M.W.) | 44.1 | 2.1 | d. Polyol D was reacted using the same general scheme as outlined above. A 2.5:1 molar ratio of polyol to azo acid was used. Analyses of the final product yielded the following data:

| Gel Permeation Chromatography | OH No. mg KOH/g | Acid No. mg KOH/g |
|---|---|---|
| 67% 3000 (M.W.) 33% 4900 (M.W.) | 40.2 | 1.7 |

Example II

Preparation of Azo-Bis Ester Polyols—$H_2SO_4$ Catalysis 3.0 g of 4,4'-azo-bis-(4-cyanovaleric acid) was mixed with 240 g of polyol A (Example I-5:1 molar ratio of polyol to acid) and 0.5 g of $H_2SO_4$ catalyst (0.2% by weight) in a 500 ml round bottom flask fitted to a rotary evaporator with constant temperature bath. The reaction conditions were 5 hours/60° C/~18 mm Hg. After approximately 4 hours of heating, solution of the azo acid was observed and the reaction was continued for an additional hour. Samples submitted for analyses indicated the following:

| Gel Permeation Chromatography | OH No. mg KOH/g | Acid No. mg KOH/g |
|---|---|---|
| 91% 4700 (M.W.) 9% 7700 (M.W.) | 27 | 4.81 (Total) |

Example III

The general scheme of the reaction as illustrated in Example II was repeated, using, however, 5 percent by weight $H_2SO_4$ mineral acid catalyst.

Product samples submitted for analyses indicated the following:

| Gel Permeation Chromatography | OH No. mg KOH/g | Acid No. mg KOH/g |
|---|---|---|
| 78.1% 4600 (M.W.) 13.0% 8000 (M.W.) 8.9% 1000 (M.W.) | 26.7 | 48.1 |

PREPARATION OF AZO-BIS ESTER POLYOLS BY TRANSESTERIFICATION

Example IV 3.0 g of 4,4'-azo-bis-(4-cyanovaleric acid methyl ester) was mixed in a 500 ml round bottom flask with 175 g of polyol and 0.3 g of sodium methoxide as catalyst. This is a 4:1 molar ratio of polyol to azo acid. The flask was fitted to a rotary evaporator with constant temperature bath. The reaction conditions were 5 hours/60° C/~18 mm Hg. Complete solution of the azo compound was noted after 4 hours. Samples submitted for analyses indicated the following:

| Gel Permeation Chromatography | OH No. mg KOH/g | Base No. mg KOH/g |
|---|---|---|
| 92% 4600 (M.W.) 8% 8000 (M.W.) | 32.2 | 0.04 |

PREPARATION OF AZO-BIS ESTER POLYOLS FROM ACID CHLORIDE

Example V

To a nitrogen purged 1L round bottom flask, equipped with a drying tube was added 7.55 g (0.024 m) 4,4'-azo-bis-(4-cyanopentanoic acid chloride) dissolved in a 10 g of methylene chloride. To this solution was added 225 g of a polyether triol (OH# 37.4) prepared from glycerol by base catalyzed addition of propylene oxide and ethylene oxide such that the ethylene oxide content is approximately 14% and the primary hydroxyl approximately 70%. The reagents were stirred for 2 hours at 40°–50° C, then stripped at 45° C and 1 mm Hg pressure for 2 hours to remove methylene chloride and gaseous HCl. The resultant pale yellow liquid which was then filtered showed an increase in viscosity and by gel permeation chromatography showed a mass peak at ~8600–9000 M.W. indicating coupling of two polyether triol molecules by esterification with the above-mentioned acid chloride.

Example VI

To a nitrogen purged 1000 ml round bottom flask, equipped with a drying tube was added 7.55 g (0.024 m) 4,4'-azo-bis-(4-cyanopentanoic acid chloride) dissolved in 10 g of methylene chloride. To this solution was added 312 g (0.048 m) of a polyether triol (OH# 26) prepared from glycerol by base catalyzed addition of propylene oxide and ethylene oxide such that the ethylene oxide content is approximately 9% and the primary hydroxyl approximately 68%. The reagents were stirred for 2 hours at 40°–50° C, then stripped at 45° C and 1 mm Hg pressure for 2 hours to remove methylene chloride and gaseous HCl. The material was filtered through a Whatman No. 1 filter. The product obtained was a clear yellow material. It showed a mass peak at 13,000 M.W. by gel permeation chromatography indicating coupling of two polyether triol molecules by esterification with the above-mentioned acid chloride. The saponification number analysis shows a value of 10.75 mg KOH/g, in good agreement with theoretical value of 9.1 mg KOH/g.

PREPARATION OF GRAFT COPOLYMERS AND POLYURETHANE PRODUCTS THEREFROM

Example VII a. As a further purification step, 150 g of the product of Example V was stirred with 15 g anhydrous sodium bicarbonate at 40°–50° C for 4 hours. It was then filtered through a millipore size filter. A clear yellow product was obtained which showed no residual 4,4'-azo-bis-(4-cyanopentanoic acid) by gel permeation chromatography.

To a three-neck 500 ml flask equipped with thermometer, stirrer, condenser and feed inlet port were added 327 g of the polyether triol described in Example V. The polyol was heated under a nitrogen atmosphere to 90° C and a solution of 50 g of the purified material (Example VII a.), dissolved in 45 g acrylonitrile and 15 g styrene were added at a rate of ~2 g/min. maintaining the reaction temperature at 88°–100° C, maintaining this temperature for 1 hour after the final addition. Any residual volatile material was stripped at 1 mm Hg pressure and 90° C. The resultant opaque polyvinyl graft polyol had a Brookfield viscosity of 1500 cps at 25° C and a hydroxyl number of 33.5.

b.1 A hand mix flexible urethane foam was prepared by a method common to the art using the following formulation:

|  | Parts By Weight |
|---|---|
| Polyether Triol (Example V) | 80 |
| Graft Polyol from Example VII | 20 |
| Triethylene Diamine[1] | 0.4 |
| Diethanolamine | 0.4 |
| Stannous Octoate | 0.15 |
| Surfactant[2] | 1.0 |
| Water | 2.0 |
| TDI-80[3] [Index] | 109 |

[1]This is a commercially available product sold under the trademark "Dabco 33 LV". It consists primarily of triethylene diamine (⅓) and dipropylene glycol (⅔).
[2]This is a commercially available polysiloxane surfactant sold under the trademark "Niax L-5303".
[3]This is a mixture of tolylene diisocyanate isomers (80/20 mixture of 2,4/2,6-isomers).

| Physical Properties | |
|---|---|
| Density, pcf[1] | 3.11 |
| ILD, Sample Thickness[2] | 4" |
| Load at 25% Deflection | 45.5 |
| Load at 65% Deflection | 99.5 |
| Sag Factor | 2.19 |
| Air Flow, cfm[3] | 2.42 |
| Ball Rebound, %[4] | 67.0 |

[1]Lbs. per cubic foot
[2]Indentation Load Deflection (lbs.) per ASTM D-1564-64T
Sag factor, a measure of the support of cushioning material is expressed as a ratio of 65% ILD to 25% ILD
[3]Cubic feet per minute per Nopco Air Picnometer Flow Test
[4]Percentage, per ASTM D-1564-64T b.2 A hand mix reaction injection molded urethane elastomer was prepared according to the following formulation:

|  | Parts By Weight |
|---|---|
| Graft Polyol from Example VII | 84 |
| MDI Prepolymer[1] | 79.8 |
| 1,4-Butane Diol | 16.0 |
| Alkyl Tin Carboxylate Catalyst[2] | 0.06 |

[1]This is a commercially available 4.4'-diphenylmethane diisocyanate prepolymer sold under the tradename "Mondur PF".
[2]This catalyst is commercially available under the trademark "UL-2".

| Physical Properties | |
|---|---|
| Density, pcf[1] | 64.0 |
| Tensile Strength[2], psi | 2130 |
| Elongation[3], pc | 130 |
| Tear Strength[4], lbs./in. | 326 |
| Hardness[5], Shore D | 55 |
| Clashberg[6], ° F | −20 |

[1]Lbs. per cubic foot per ASTM 1564-64
[2]Lbs. per square inch per ASTM 1564-64
[3]Percent per ASTM 1564-64
[4]Lbs. per linear inch per ASTM 1564-64
[5]Shore Test, D scale
[6]Tangential modulus test

Example VIII a. To a three-neck 1000 ml flask equipped with thermometer, stirrer, condenser and feed inlet port were added 110 g of polyether triol B (Example I 1 b.). The polyol was heated under $N_2$ to 100° C. A blend of 112.5 g acrylonitrile, 37.5 g styrene and 240 g of product of Example I 2 b. (azo polyol B) were added at ~0.8 g/min. feed rate. The reaction temperatures maintained at 100° C throughout. At the end of feeding, 1 hour post reaction time was allowed. Any residual volatile material was stripped at 1 mm Hg pressure and 100° C. The resultant opaque polyvinyl graft polyol had a Brookfield viscosity of 3750 cps at 25° C and a OH number of 23 mg KOH/g.

b. A hand mix flexible urethane foam was prepared by a method common to the art using the following formulation (See Example VII for definitions):

|  | Parts By Weight |
|---|---|
| Polyether Polyol B (Example I 1 b.) | 80 |
| Graft Polyol from Example VIII | 20 |
| Triethylene Diamine | 0.4 |
| Dibutyl Tin Dilaurate | 0.1 |
| Stannous Octoate | — |
| Diethanolamine | 0.8 |
| Surfactant | 1.0 |
| Water | 2.0 |
| TDI-80 [Index] | 109 |

Foam processing was good. Following foam physicals[1] were obtained.
[1]See Example VII for definitions

|  |  |
|---|---|
| Compression Deflection, 25% | 0.37 psi |
| Compression Deflection, 65% | 0.92 psi |
| Sag Factor | 2.48 |
| Density | 3.02 pcf |

Example IX a. To a three-neck 1000 ml flask equipped with thermometer, stirrer, condenser and feed inlet port were added 240 g of polyether triol B (Example I 1 b.). The polyol was heated under N$_2$ to 100° C. A blend of 150 g polyether triol B, 50 g acrylonitrile and 60 g of product of Example I 2 b. (azo polyol B) were added at ~1 g/min. feed rate. The reaction temperature was maintained at 100° C throughout. At the end of feeding, 1 hour post reaction time was allowed. Any residual volatile material was stripped at 1 mm Hg pressure and 100° C. The resultant opaque polyvinyl graft polyol had a Brookfield viscosity of 7400 cps at 25° C.

b. A hand mix flexible urethane foam was prepared by a method common to the art using the following formulation (See Example VII for definitions):

|  | Parts By Weight |
|---|---|
| Polyether Polyol B (Example I 1 b.) | 80 |
| Graft Polyol from Example IX | 20 |
| Triethylene Diamine | 0.4 |
| Dibutyl Tin Dilaurate | 0.1 |
| Stannous Octoate | — |
| Diethanolamine | 0.8 |
| Surfactant | 1.0 |
| Water | 2.0 |
| TDI-80 [Index] | 109 |

Foam processing was good. Following foam physicals[1] were obtained.

[1] See Example VII for definitions

| Compression Deflection, 25% | 0.28 psi |
|---|---|
| Compression Deflection, 65% | 0.71 psi |
| Sag Factor | 2.55 |
| Density | 2.73 pcf |
| Air Flow | 1.20 cfm |
| Tensile | 11.48 psi |
| Tear | 1.11 pli |
| Elongation | 133 % |
| Ball Rebound | 56 % |

Example X a. To a three-neck 500 ml flask equipped with thermometer, stirrer, condenser and feed inlet port were added 240 g of polyether triol C (Example I 1 c.). The polyol was heated under N$_2$ to 100° C. A blend of 78 g polyether triol C, 825 g acrylonitrile, 27.5 g styrene and 82 g of product of Example I 2 c. (azo polyol C) were added at ~1 g/min. feed rate. The reaction temperature was maintained at 100° C throughout. At the end of feeding, one hour post reaction time was allowed. Any residual volatile material was stripped at 1 mm Hg pressure and 100° C. The resultant opaque polyvinyl graft polyol had a Brookfield viscosity of 1000 cps at 25° C and a OH number of 47 mg KOH/g.

b. A hand mix flexible urethane foam was prepared by a method common to the art using the following formulation (See Example VII for definitions):

|  | Parts By Weight |
|---|---|
| Polyether Polyol C (Example III 1 c.) | — |
| Graft Polyol from Example X | 100 |
| Triethylene Diamine | 0.25 |
| Dibutyl Tin Dilaurate | — |
| Stannous Octoate | 0.2 |
| Diethanolamine | — |
| Surfactant | 1.0 |
| Water | 3.0 |
| TDI-80 [Index] | 105 |

Foam processing was good. Following foam physicals[1] were obtained.

[1] See Example VII for definitions

| Compression Deflection, 25% | 0.83 |
|---|---|
| Compression Deflection, 65% | 1.55 |
| Sag Factor | 1.88 |
| Density | 2.15 |
| Air Flow | 2.3 |
| Tensile | 22.44 |
| Tear | 2.29 |
| Compression Set, 50% | 3.53 |

Example XI a. To a three-neck 500 ml flask equipped with thermometer, stirrer, condenser and feed inlet port were added 240 g of polyether triol D (Example I 1 d.). The polyol was heated under N$_2$ to 100° C. A blend of 78 g polyether triol D, 82.5 g acrylonitrile, 27.5 g styrene and 82 g of product of Example I 2 d. (azo polyol D) were added at ~1 g/min. feed rate. The reaction temperature was maintained at 100° C throughout. At the end of feeding, 1 hour post reaction time was allowed. Any residual volatile material was stripped at 1 mm Hg pressure and 100° C. The resultant opaque polyviny graft polyol had a Brookfield viscosity of 1135 cps at 25° C.

b. A hand mix flexible urethane foam was prepared by a method common to the art using the following formulation (See Example VII for definitions):

|  | Parts By Weight |
|---|---|
| Polyether Polyol D (Example I 1 d.) | — |
| Graft Polyol from Example XI | 100 |
| Triethylene Diamine | 0.25 |
| Dibutyl Tin Dilaurate | — |
| Stannous Octoate | 0.2 |
| Diethanolamine | — |
| Surfactant | 1.0 |
| Water | 3.0 |
| TDI-80 [Index] | 105 |

Foam processing was good. Following foam physicals[1] were obtained.

[1] See Example VII for definitions

| Compression Deflection, 25% | 0.85 |
|---|---|
| Compression Deflection, 65% | 1.54 |
| Sag Factor | 1.80 |
| Density | 2.12 |
| Air Flow | 0.3 |
| Tensile | 20.98 |
| Tear | 1.87 |
| Compression Set, 50% | 3.93 |

We claim:

1. An azo di-ester polyol characterized by the formula:

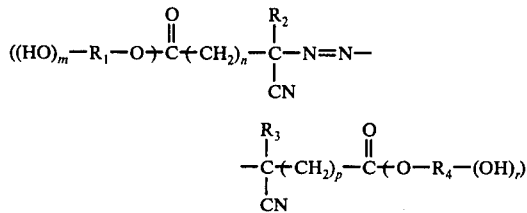

wherein:
m and r independently represent integers from 2 to 5;
n and p independently represent integers from 0 to 5;
R₂ and R₃ independently represent alkyl of 1 to 4 carbons; and $((HO)_m-R_1-O)$ and $(-O-R_4-(OH)_r)$ independently represent residues of polyether or polyester polyols, $R_1(OH)_{m+1}$ and $R_4(OH)_{r+1}$, wherein $R_1$ and $R_4$ independently represent polyether or polyester chains, having an average equivalent weight of from about 250 to 5000, after removal of one hydroxy hydrogen therefrom.

2. The azo di-ester polyol of claim 1 wherein n and p independently represent integers from 0 to 2 and R₂ and R₃ independently represent alkyl of 1 to 3 carbons.

3. The azo di-ester polyol of claim 1 wherein:
$((HO)_m-R_1-O)$ and $(-O-R_4-(OH)_r)$ independently represent residues of polyether polyols, $R_1(OH)_{m+1}$ and $R_4(OH)_{r+1}$, after removal of one hydroxy hydrogen therefrom.

4. The azo di-ester of claim 3 wherein m and r each represent 2.

5. The azo di-ester polyol of claim 1 wherein m and r, n and p, R₂ and R₃, and $((HO)_m-R_1-O)$ and $(-O-R_4-(OH)_r)$ are all respectively the same, whereby a symmetrical azo-bis ester polyol is represented.

6. The azo-bis ester polyol of claim 5 wherein $((HO)_m-R_1-O)$ and $(-O-R_4-(OH)_r)$ both represent residues of a polyether polyol.

7. The azo-bis ester polyol of claim 6 wherein m and r each represent 2.

8. The azo-bis ester polyol of claim 7 wherein the polyether triol has an equivalent weight ranging from about 700 to 3000.

9. The azo-bis ester polyol of claim 8 wherein the polyether triol has an equivalent weight ranging from about 1000 to 1500.

10. The compound of claim 5 characterized by the formula:

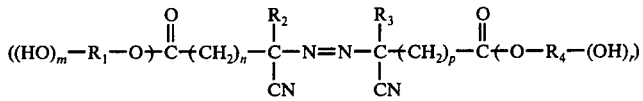

wherein:
m and r are the same and represent an integer from 2 to 5;
n and p are the same and represent an integer from 0 to 2;
R₂ and R₃ are the same and represent an alkyl of 1 to 3 carbons; and
$((HO)_m-R_1-O)$ and $(-O-R_4-(OH)_r)$ are the same and represent residues of polyols, $R_1(OH)_{m+1}$ and $R_4(OH)_{r+1}$, after removal of one hydroxy hydrogen therefrom.

11. The compound of claim 5 characterized by the formula:

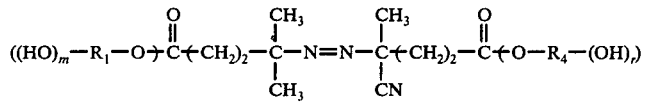

wherein:
m and r are the same and represent the integer 2; and
$((HO)_m-R_1-O)$ and $(-O-R_4-(OH)_r)$ are the same and represent a residue of a polyether triol having an equivalent weight of about 1000 to 1500 after removal of one hydroxy hydrogen therefrom.

* * * * *